United States Patent [19]

Mote et al.

[11] 3,945,851

[45] Mar. 23, 1976

[54] SILVER ZINC ELECTRIC STORAGE CELLS

[75] Inventors: Harold Trevor Mote, North Harrow, England; Laszlo Hajdu, Budapest, Hungary; Bela Ronay, Erlangen, Germany

[73] Assignees: Medicharge Limited, North Harrow, England; Medicor Muvek, Budapest, Hungary

[22] Filed: June 13, 1974

[21] Appl. No.: 479,157

[30] Foreign Application Priority Data
June 14, 1973  United Kingdom............... 28443/73

[52] U.S. Cl.................................. 136/111; 136/145
[51] Int. Cl.²......................................... H01M 43/02
[58] Field of Search .......... 136/145, 146, 144, 143, 136/148, 111, 20, 30, 31

[56] References Cited
UNITED STATES PATENTS

| | | |
|---|---|---|
| 2,484,787 | 10/1949 | Grant.................................. 136/145 |
| 2,653,986 | 9/1953 | Philipps ............................. 136/145 |
| 3,438,812 | 4/1969 | Cherney et al. .................. 136/20 X |
| 3,758,343 | 9/1973 | Magritz............................. 136/111 |

*Primary Examiner*—Anthony Skapars
*Attorney, Agent, or Firm*—Brisebois & Kruger

[57] ABSTRACT

In order to increase the cyclability life of rechargeable silver-zinc electric storage cells, the semi-permeable membrane separator between the silver and zinc electrodes comprises a laminate of plies of semi-permeable oriented cellophane foil bonded together with the electrolyte with some of the plies arranged cross-wise, as regards their direction of orientation, relative to another ply of the membrane. In a preferred embodiment a further single layer of cellophane is disposed between the silver electrode the absorbent paper layer which is normally positioned between the silver electrode and the membrane.

5 Claims, 1 Drawing Figure

U.S. Patent March 23, 1976 3,945,851
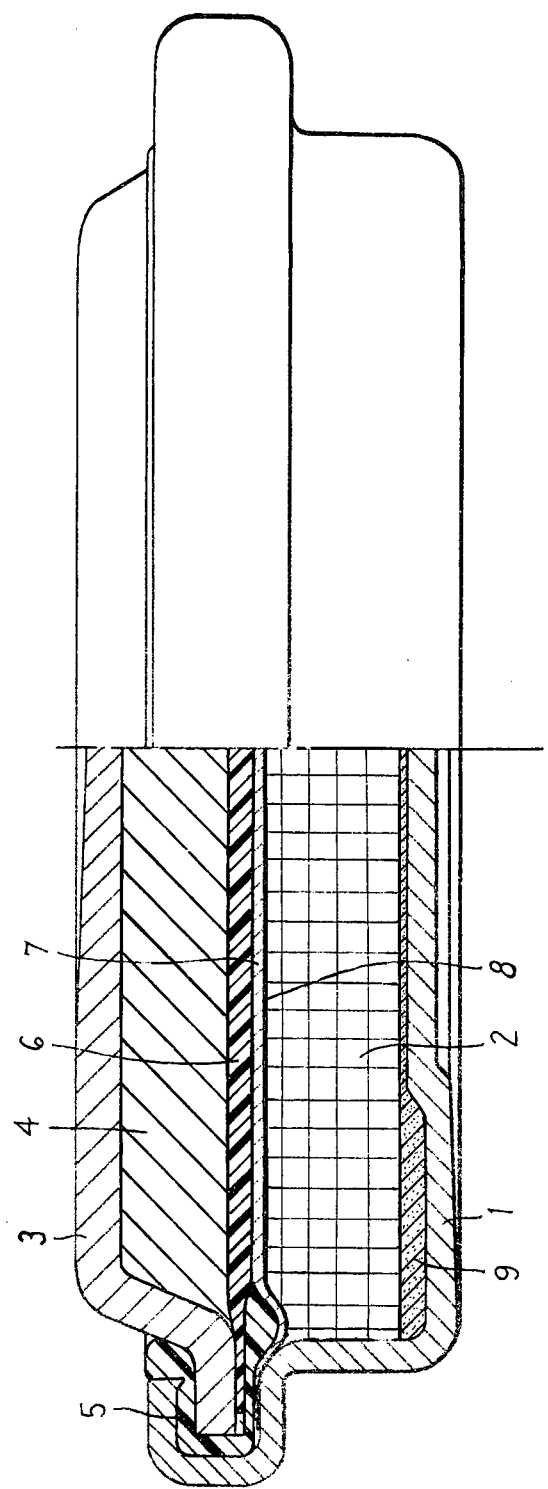

SILVER ZINC ELECTRIC STORAGE CELLS

The invention relates to rechargeable silver-zinc storage cells and particularly but not exclusively to hermetically sealed miniature rechargeable silver-zinc storage cells and batteries.

The semi-permeable separator between the silver and zinc electrodes has a considerable influence on operation of silver-zinc storage cells. An effective separator must be able to resist the powerful oxidative and alkaline cell environment, prevent diffusion of the soluble silver species to the zinc electrode and growth of dendritic zinc towards the silver electrode, as well as providing the ionic path between the electrodes and acting as an insulator. Hitherto such separators have generally comprised a semi-permeable membrane constructed of a plurality of layers or plies of regenerated cellulosic material, such as cellophane, which are laminated together. Separators are an important factor in determining the cyclic lifetime of a rechargeable cell, that is the number of times that the cell may be discharged and recharged before the separator becomes degraded and short circuits arise in the cell. Exposure to the active material AgO of the silver electrode causes the material of the separator to become oxidized, which contributes to an early failure of the cellophane material. There is also colloidal dissolution of the electrode and silver deposition in the pores of the separator, which leads to an undesirable increase in cell resistance due to clogging of the pores. Another problem is that the part of the zinc electrode which is dissolved in the electrolyte tends to be reducible in the final period of charging into a dendritic form (as acicular crystals) which tend to pierce the separator, resulting in short circuits.

The cyclability life of a cell can be increased by increasing the number of laminations forming the separator, but this results in an undesirable increase in the cell resistance.

Various attempts to solve these problem have been made including using for the separator layers of grafted copolymers which, while providing some improvement, are considerably more expensive than the conventional cellophane material and still do not produce a cyclability life approaching that of nickel-cadmium cells which normally have a life of not less than 300 cycles.

It is known that cellophane and like cellulosic materials and plastics material in foil or film form, which has been stretched in one direction acquires an oriented structure having a greater tensile strength in the direction of orientation than in the direction transverse thereto. Such oriented foil or film materials are referred to herein and in the appended claims as "oriented foil material".

The materials used for the plies of the laminated separator have an oriented structure, with a greater tensile strength in the direction of orientation than in the transverse direction. The technique of making the separators is to unwind the ply material from a roll, laying the successive plies on top of one another and bonding them together with the electrolyte and, after drying the laminate, cutting it to the size required for the separators. With this method of construction all the plies of the laminate are oriented in the same direction. We have discovered that the cyclability life of a separator is substantially improved if the direction of orientation of the adjacent plies are disposed cross-wise, and the present invention consists in a silver-zinc storage cell wherein the separator comprises laminated plies of semi-permeable oriented foil material, bonded together with the electrolyte, of which some of the plies are arranged cross-wise as regards their direction of orientation relative to another ply or plies.

In order to reduce colloidal dissolution of the silver into the separator, it has been the practice to introduce an additional partition layer of paper between the silver electrode and the separator. We have further discovered that the cyclability life of a cell can be further increased by disposing an additional layer of semi-permeable cellulosic or like foil material between the paper and the silver electrode. Thus the invention also consists in a rechargeable silver-zinc storage cell wherein the separator comprises a laminate of plies of semi-permeable oriented foil material which are bonded together with the electrolyte and of which some of the plies are oriented cross-wise relative to the other or others, and wherein there is disposed between the separator and the silver electrode a layer of paper and a layer of semi-permeable foil material, the latter being disposed on the side of the paper adjacent to the silver electrode.

It has been conventional to use 5 plies of oriented foil material in the construction of separators for miniature hermetically sealed cells which have been produced commercially. In carrying out the present invention the number of plies in the separator is preferably from 3 to 5. By using 3 or 4 plies in the separator with the one additional semi-permeable foil layer referred to between the paper layer and the silver electrode, the total amount of material used in the cell is not increased, while the cyclability life of the cell is improved to a figure comparable with that of nickel-cadmium cells.

In order that the invention may be more clearly understood, reference will now be made to the accompanying drawing which shows a half-section through a hermetically sealed rechargeable silver-zinc cell, known as a "button cell", constructed in accordance with a preferred embodiment of the invention.

Referring to the drawing, the cell comprises a circular casing comprising two cup-shaped parts 1 and 3. The case part 1 is pressed of corrosion-resistant sheet metal and coated on its inside with a non-porous silver layer, and contains a silver electrode 2. Electrical connection to the electrode is provided by the metal case part 1. The zinc electrode 4 is pressed into the case part 3 made of the same corrosionresistant sheet metal and covered on the inside with a double layer of zinc amalgam. The case parts 1 and 3 are secured together by spinning the rim of the part 1 over the flange of the part 3 with the interposition of an insulating gasket 5 of plastics material. Between the casing parts are clamped the main separator 6 comprising a semi-permeable membrane, a paper layer 7 and an additional layer 8 of cellophane as shown. Before assembling, both electrodes and all components are impregnated with a solution of potassium hydroxide.

The main separator 6 is made of between 3 and 5 plies of cellophane with the direction of orientation in each ply arranged cross-wise, preferably at 90°, with respect to the direction of the orientation of the adjacent ply. The plies are impregnated with the electrolyte, laminated together without air bubbles or other pockets therebetween, dried, and cut into discs for assembly in a cell.

In a preferred embodiment, the cell also contains a second depolarizer material 9, such as cadmium oxide, to reduce the risk of reverse polarization when the cell is used in a rechargeable electric battery.

Although it is preferred to construct the semi-permeable membrane 6 and the additional foil layer 8 from cellophane or like cellulosic materials for economic reasons, it will be understood that if desired these components may be made from grafted copolymers or other suitable microporous materials.

We claim:

1. A rechargeable silver-zinc electric storage cell comprising a casing enclosing a silver electrode and a zinc electrode, a separator comprising an imperforate semi-permeable membrane disposed between said electrodes, and an electrolyte, said membrane being sealed to the casing so that the only ion path between the electrodes is through said membrane, characterised in that said imperforate semi-permeable membrane comprises a laminate of plies of semipermeable oriented foil material bonded together with the electrolyte with some of the plies arranged cross-wise, as regards their direction of orientation, relative to another ply of the membrane.

2. A cell as claimed in claim 1, wherein there is disposed between said membrane and the silver electrode, a layer of paper and a layer of semi-permeable foil material, the latter being disposed on the side of the paper layer adjacent to the silver electrode.

3. A cell as claimed in claim 1, comprising a casing comprising two metal cup-shaped parts hermetically secured together around their peripheries with the interposition of a gasket of electrical insulating material therebetween, one of said cup-shaped parts containing the silver electrode, and the other cup-shaped part containing the zinc electrode, there being clamped between the peripheries of said casing parts, so as to extend between the two electrodes, said membrane, and a layer of paper and a layer of semi-permeable foil material between said membrane and the silver electrode with said layer of semipermeable foil material adjacent the silver electrode, both said electrodes and the other components within the casing being impregnated with a solution of the electrolyte.

4. A cell as claimed in claim 3, wherein the electrolyte is potassium hydroxide.

5. A cell as claimed in claim 1, wherein said separator comprises plies of oriented regenerated cellulosic foil material bonded together with the electrolyte.

* * * * *